July 21, 1970      C. W. JOHNSTON      3,521,231
TIRE PRESSURE DIFFERENTIAL SENSING AND INDICATING DEVICE
Filed Nov. 9, 1967      2 Sheets-Sheet 1
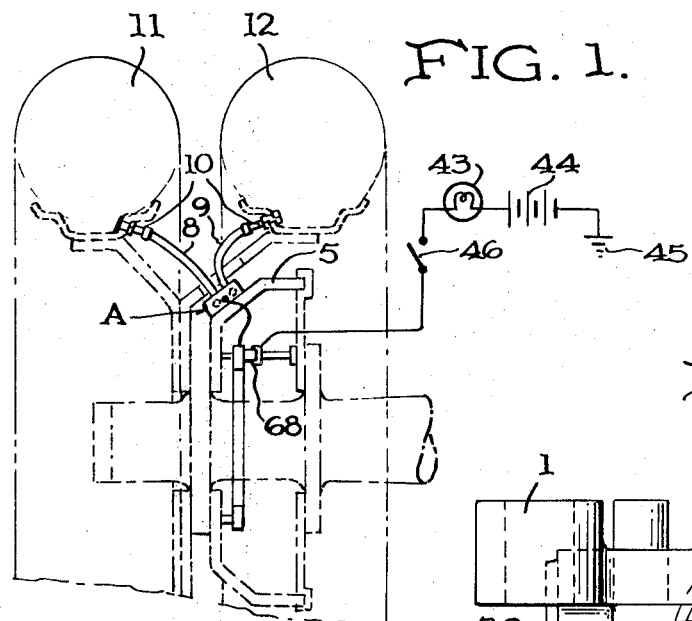
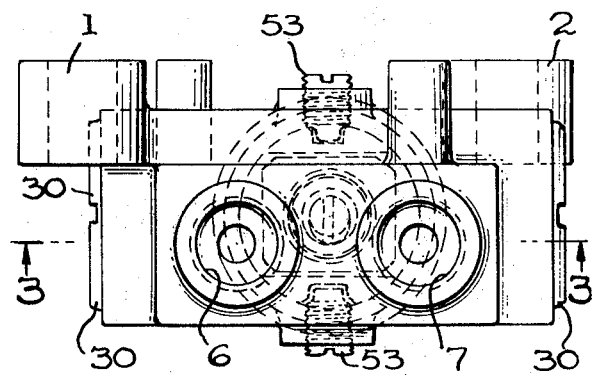
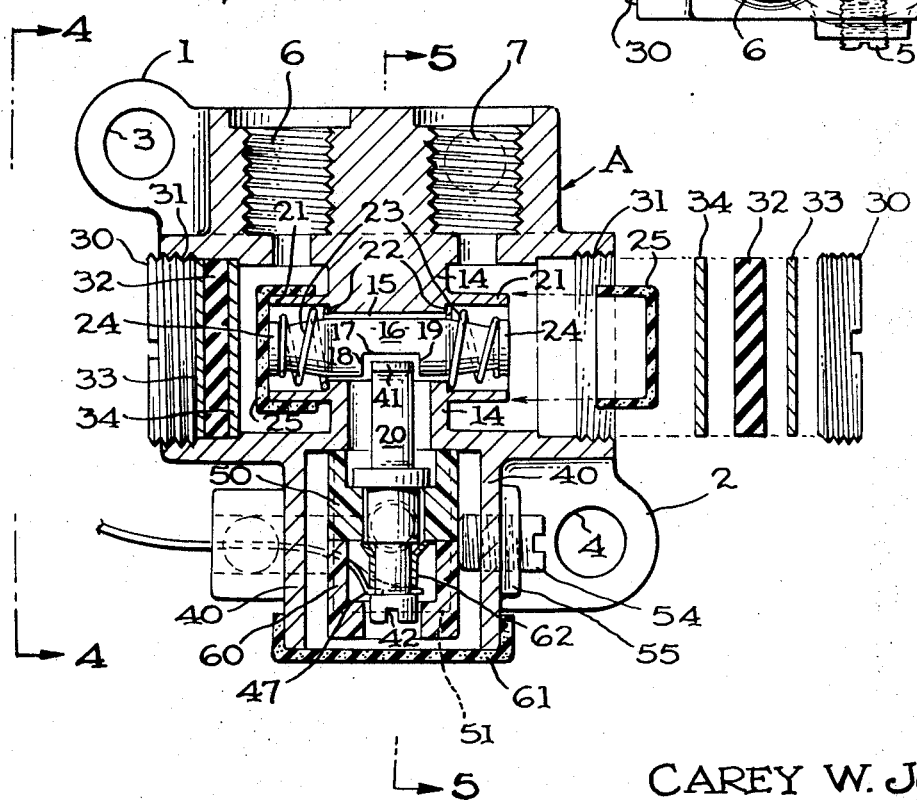
INVENTOR
CAREY W. JOHNSTON
BY
ATTORNEY July 21, 1970  C. W. JOHNSTON  3,521,231
TIRE PRESSURE DIFFERENTIAL SENSING AND INDICATING DEVICE
Filed Nov. 9, 1967  2 Sheets-Sheet 2
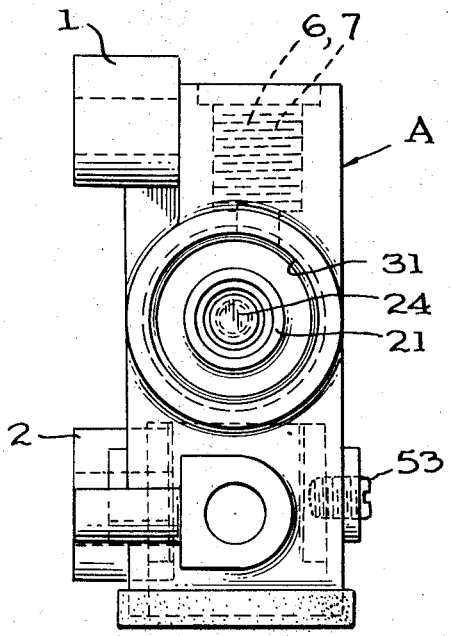
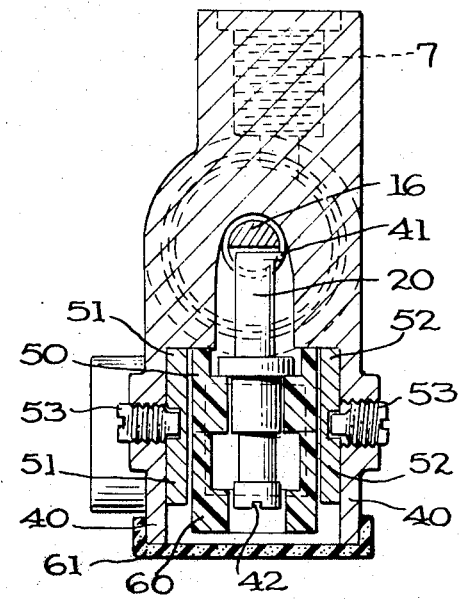
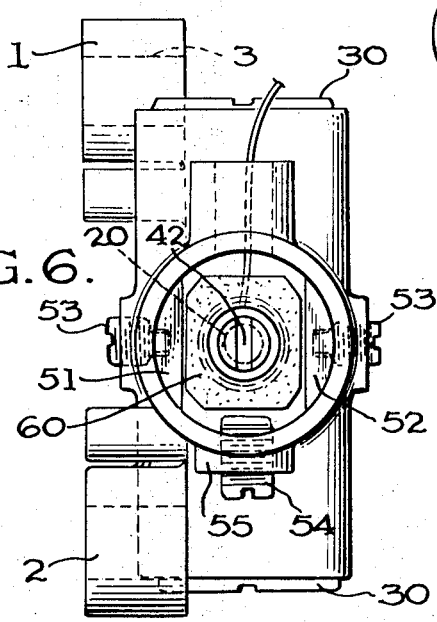
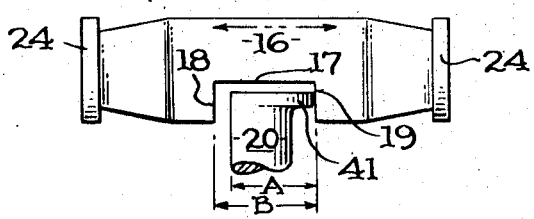
INVENTOR
CAREY W. JOHNSTON
BY *Ralph I. Braswell*
ATTORNEY

United States Patent Office 3,521,231
Patented July 21, 1970

3,521,231
TIRE PRESSURE DIFFERENTIAL SENSING AND INDICATING DEVICE
Carey W. Johnston, 591 Edgewood Road, Leonia, N.J. 07605
Filed Nov. 9, 1967, Ser. No. 681,652
Int. Cl. B60q 1/00
U.S. Cl. 340—58                                  7 Claims

ABSTRACT OF THE DISCLOSURE

A tire pressure differential sensing device embodying a housing partitioned to define two chambers, the partition being provided with a transverse bore for receiving a piston balanced by calibrated springs and subject to pressure of air from dual tires, the sliding balanced piston being slotted for association with a contact pin connected to a signal and the contact pin being mounted in an insulated chamber and provided with a foot-like extension which is adjustable in the transverse slot for sensing the position of the sliding piston as defined by the pressure in the tire to which the device is connected.

---

This invention relates to improvements in tire pressure sensing and indicating devices and particularly a device for use in connection with dual tires for automotive vehicles where on of the dual tires is under-inflated resulting in unsafe conditions and uneven wear from the tire during service conditions.

The main object of the invention is to provide an accurate sensing and indicating mechanism which is provided with means for accurately adjusting the operating parts to secure accurate predetermined operation of the device in accordance with predetermined conditions.

This and other objects of the invention will more clearly hereinafter appear by reference to the accompanying drawings forming a part of the instant specification and wherein like characters of reference designate corresponding parts throughout the several views, in which:

FIG. 1 is a partial vertical section through a dual tire assembly showing the arrangement of the invention;

FIG. 2 is a top plan view of the housing enclosing the valve mechanism;

FIG. 3 is a front elevation taken on line 3—3 of FIG. 2;

FIG. 4 is a side elevation taken on line 4—4 of FIG. 3;

FIG. 5 is a vertical cross-section taken on line 5—5 of FIG. 3;

FIG. 6 is a bottom plan view;

FIG. 7 is a section showing the sliding valve in adjusted position; and

FIG. 8 is a detail showing of the sliding piston and valve shoe.

In accordance with the present embodiment, a housing A containing the operating mechanism is provided with integral projecting lugs 1 and 2 formed with bolt openings 3 and 4 for the reception of appropriate bolts for securing the same to a part of a dual wheel assembly, such as the brake housing 5, as shown in FIG. 1.

The housing A at one end is provided with threaded openings 6 and 7 for receiving the terminals of flexible conduits 8 and 9 connected with the inflation valves 10 of the dual tires 11 and 12, whereby the air pressure within the tires 11 and 12 can be conducted and delivered into the housing A for controlling the operating mechanism hereinafter described. The housing A is provided with a central partition 14 which divides the housing into two separate chambers and these chambers are connected by a transverse annular passageway 15 in which is located a slide piston 16 extending through the transverse passageway 15 and into the two oppositely provided chambers in the housing A. The slide piston 16 is formed at its outer medial surface with a transverse slot 17 having end walls 18 and 19 for engagement with a contact pin 20.

In axial alignment with the transverse annular passageway 15 and projecting from the lateral faces of the partition 14 are the annular projections 21 which house the projecting terminals of the slide piston 16. The annular projections 21 are of greater diameter than the passageway 15, thereby providing annular shoulders 22 which seat the inner ends of the calibrated springs 23. The outer ends of the slide piston are formed with annular projections 24 against which the outer terminals of the calibrated springs seat, whereby the calibrated springs normally urge the slide piston into a central position and the springs resist axial movement of the piston in either direction. Caps 25 having flexible base portions are positioned over the ends of the annular projections 21 and these caps 25 are made of resilient material and normally are adjacent the ends of the slide piston 16, whereby equal air pressure from the tires will cause the flexible caps to engage the slide piston and the piston will be retained in its central position and any substantial modifications of the air pressure through ports 6 and 7 from the tire to which the ports are connected will cause a lateral shifting of the piston for engaging the terminal of the contact pin 20.

The chambers formed at each end of the piston 16 are closed by screw plugs 30 which engage the threads 31 in the chamber openings and any leakage through the plug openings is sealed by the resilient gaskets 32 and the metal discs 33 and 34 at each side of the resilient gaskets 32. This laminated multiple seal prevents any leakage which might occur and is necessary as the structure is subject to multiple vibrations in use, being mounted on the wheel assembly.

An annular sealed chamber is provided for the contact pin 20 and is formed by the annular projecting wall 40 at the outer end of the housing A. The contact pin 20 with its offset terminal shoe 41 at its inner end is adapted to be mounted for rotation about its axis through the open end of the chamber formed by wall 40, the contact pin having at its outer end a slot 42 in its head for the reception of a screwdriver to facilitate its axial adjustment. The contact pin is connected to an indicator signal light 43 and to a source of power, such as battery 44, to ground 45, there being an appropriate switch 46 in the line and the terminal of the line having engagement adjacent the head of the contact pin, as shown at 47 in FIG. 3. The contact pin 20 is held by sliding insulated block 50, as best shown in FIG. 3, and this block is held in central sliding position by the adjustable segmental filler blocks 51 and 52 position against the arcuate inner surface at each side of the housing as shown in FIG. 6. These filler blocks 51 and 52 can be adjusted to regulate the spacing with respect to the insulated sliding block 50 by means of screw 53 which goes through the wall of the annular projection forming the housing for the contact pin 20. A further adjustment by means of a screw 54 extending through the projection 55 of the cylindrical wall 40 provides for adjusting the block 50 and the contact pin 20 in its slideway as provided by the filler blocks 51 and 52, as shown in FIG. 6.

Referring again to FIG. 3, it will be seen that an additional insulating block 60 is provided between the sliding block 50 and the closure cap 61 of the contact pin housing, the insulated filler block 60 preventing the sliding block 50 from longitudinal displacement with respect to the axis of the contact pin 20. A spring washer 62 is provided about the end portion of the pin within the insulating block 60 to retain the spring terminal clip at the end of the lead wire in its engagement with the contact pin 20.

In connection with the wiring, it will be noted from FIG. 1 that the wiring for the indicator light, the source of power, the ground and the switch is associated with a conventional collector ring 68 for connection with the lead wire and the contact pin 20.

Initially, the device is adjusted by providing two sources of pressure or two tires with identical pressure. After relieving the air in one source of air pressure a predetermined amount, as for instance ten pounds, which will result in a piston movement to the right, the contact pin 20 may be moved so that the side of the pin and shoe will engage the nearby wall 18 of the slot 17 in the sliding piston as shown in FIG. 7. This contact pin movement is accomplished by the inward adjustment of screw 54 against the insulating blocks 50 and 60. At this point the filler blocks 51 and 52 may be snugly forced against the adjacent sides of the insulating blocks 50 and 60 to prevent further longitudinal and lateral movement of blocks 50 and 60 and the pin 20 contained therein.

Having thus obtained a contact position for a pressure loss in tire 12, and to obtain a contact position for tire 11, the pressure loss in tire 12 is then restored and brought into balance with tire 11. The pressure in tire 11 is then reduced ten pounds, with a subsequent leftward movement of the piston. Contact position for tire 11 is then obtained by a partial, axial clockwise rotation of pin 20 by a screwdriver adjustment at 42 (FIG. 8). Further adjustments of the shoe 41 on the contact pin 20, as well as the longitudinal axis of the pin 20, are available by adjusting the screws 53 at each side of the housing and the screw 54 so that the insulated blocks carrying the pin can be positioned both longitudinally and transversely to accomplish the proper positioning of the contacts.

What is claimed is:

1. In a tire pressure differential sensing device, a housing having a partition therein defining a pair of pressure chambers, a pair of tires, means connecting one tire to each chamber, a transverse passageway in said partition, a sliding piston positioned in said passageway with its end portions extending into said chambers, an axially arranged annular chamber defined by annular wall portions at each side of said partition encompassing the projecting ends of said piston, said chambers being of greater diameter than said passageway to provide annular shoulders, calibrated springs about the ends of said piston seating on said annular shoulders at each end and having their opposite ends engaging the outer end portions of said sliding piston to maintain said piston in an intermediate position, caps sealing said annular chambers at their outer ends and comprising flexible base portions and flanges, said caps having their flanges engaging said annular wall portions and their flexible base portions overlying said piston, whereby differential pressure in said chambers will urge said caps into engagement with said piston to move said piston, a transverse slot in the outer medial face of said piston and a contact pin mounted in the wall of said housing in adjustable insulated blocks, said contact pin having an extension projecting between the walls defining the slot in said piston, whereby movement of said piston will close a contact between the contact pin and the piston, and indicator means and a source of power connected to said contact pin.

2. The invention of claim 1 wherein the contact pin is mounted in an insulated sliding block within an annular recess in the housing wall, and adjustable segmental filler blocks are provided at each side of said recess for transversely adjusting and aligning said block and said contact pin.

3. The invention of claim 2 wherein additional means are provided for adjusting said block in another direction.

4. The invention of claim 1 wherein the contact pin is rotatably mounted in an adjustable block and is provided with a lateral projection at its inner end whereby rotation of said pin will move said lateral projection with respect to the walls of said transverse slot.

5. The invention of claim 4 wherein the contact pin is adjustably mounted in a chamber sealed from communication with the pressure chambers.

6. The invention of claim 1 wherein integral projections are provided having bolt openings for securing the sensing device to a supporting structure.

7. The invention of claim 1 wherein closure means are provided for closing the axially arranged annular chambers, said closure means including plugs threaded into said chambers and a resilient compression washer is compressed by said closure means through the medium of metal plates positioned at each side of said resilient washer.

References Cited

UNITED STATES PATENTS

| 2,860,321 | 11/1958 | Strickland et al. | 340—58 |
| 3,329,934 | 7/1967 | Wooden | 340—58 |
| 3,380,021 | 4/1968 | Dudar | 340—58 |
| 3,421,144 | 1/1969 | Bustos | 340—58 |

ALVIN H. WARING, Primary Examiner

U.S. Cl. X.R.

200—61.25